Sept. 5, 1961   J. HEIDENHAIN   2,999,034
METHOD OF MANUFACTURE OF LINE PLATES, SCALES, AND THE LIKE
Filed Oct. 21, 1960   4 Sheets-Sheet 1

INVENTOR
JOHANNES HEIDENHAIN
BY *Ernest Montague*
ATTORNEY

Sept. 5, 1961 J. HEIDENHAIN 2,999,034
METHOD OF MANUFACTURE OF LINE PLATES, SCALES, AND THE LIKE
Filed Oct. 21, 1960 4 Sheets-Sheet 3

INVENTOR
JOHANNES HEIDENHAIN
BY
ATTORNEY

Sept. 5, 1961   J. HEIDENHAIN   2,999,034
METHOD OF MANUFACTURE OF LINE PLATES, SCALES, AND THE LIKE
Filed Oct. 21, 1960   4 Sheets-Sheet 4

INVENTOR
JOHANNES HEIDENHAIN

ATTORNEY.

2,999,034
METHOD OF MANUFACTURE OF LINE PLATES, SCALES, AND THE LIKE

Johannes Heidenhain, Egerer, near Chieming, Upper Bavaria, Germany, assignor to Fa. Wenczler & Heidenhain, Traunreut, near Traunstein, Upper Bavaria, Germany, a corporation of Germany
Filed Oct. 21, 1960, Ser. No. 64,202
7 Claims. (Cl. 117—5.5)

The present invention relates to a method of manufacturing line plates, scales, and the like, and in particular to the manufacture of precision figures or transparent bases and serves the purpose in the first place to manufacture longitudinal and circular scales of highest exactness, as well as the manufacture of precision line plates for optical devices, for instance of occular-line plates, etc.

This is a continuation-in-part application of the application Serial No. 789,385, filed January 27, 1959, now abandoned.

It is known already to manufacture such precision parts by photo-mechanical means in connection with metal layers applied in vapor form in vacuum. In order to achieve this end, a line base is first applied to a prepared carrier, for instance to a cleaned glass surface and then the desired signs and figures are removed or recessed in said line base by mechanical or photo-mechanical means in such a manner that the carrier, for instance glass, appears in the recessed portions thereof. In accordance with a further step, the thus prepared line base is covered with a thin metal layer either electrolytically, chemically, or by means of applying the same in vapor form in a vacuum. Finally, the line base is removed completely by means of, for instance, a solvent, so that the metal layer only remains within the recessed signs on the carrier, for instance glass, lightly sitting thereon. These sign forming metal layers have, however, the great disadvantage, that they produce a polished surface. This light occurrence on such polished surfaces leads to a reduction of the contrast in optical devices not only when the scales, line plates, etc. are used in a looking through method, but first of all also by using the looking on method.

It is, therefore, one object of the present invention to provide means to avoid the above-stated drawback.

It is another object of the present invention to provide a method of manufacturing line plates, scales, and the like, wherein the signs are formed by glass-like substances and the following process is followed:

(1) Applying of a layer serving as a line base on a carrier, for instance a glass surface.

(2) Removal of the line base at predetermined points, so that the desired figures are achieved by recesses in a line layer in which recesses the material of the carrier, for instance a glass surface, is clearly visible.

(3) Covering of the line base which has been provided with the recesses to form the signs with a transparent layer of glass-like substances, for instance of oxides, as SiO, $SiO_2$, or fluorides, as $MgF_2$, $ThF_4$, the optical layer thickness of said layer amounting to about one-quarter of the wave length of the light, with which the finished line plae, scale, etc. is to be used. The language "optical thickness" applied here and below is to be construed as the product of the geometrical thickness of the layer with the refractive index of the layer material.

(4) Covering of the glass-like layer with a non-transparent film, for instance a metal film, as chrome.

(5) Covering this non-transparent layer and the metal layer, respectively, with a transparent layer of glass-like substances corresponding with step 3, the optical thickness of which amounts to about one-quarter of the wave length of the light, with which the finished line plate, scale, etc. is to be used.

(6) Removal of the line base which remains after step 2 jointly with the layers applied on top thereof, which layers comprise glass-like substances and non-transparent material, for instance metal, so that only the ranges of the layers of glass-like substances and non-transparent material, for instance metal, remain further rigidly connected with the carrier, on which the lower glass-like layer applied in step 3 sits directly on the carrier, for instance the glass surface.

By interposing a glass-like layer in the step 3, the optical thickness of which is about equal to one-quarter of the wave length of the light, in which the finished line plate, scale, etc. is to be used, it is achieved that the light reflected from the applied layers onto the carrier is appreciably weakened as to its intensity by air interference effect. Due to the application of the second glass-like layer in step 5, the optical thickness of which is likewise about one-quarter of the wave length of the light, in which the finished line plate and scale, respectively, is to be used, it is achieved, that the light reflected from the applied layers outwardly and into the surrounding air space, respectively, is appreciably reduced as to its intensity.

Instead of applying a single glass-like layer in step 3 and the likewise single glass-like layer in step 5, it is possible to provide multiple layers of glass-like substances with different breaking indexes in step 3 and/or in step 5, the thickness of which layers is measured in such a manner that its interference effect is amplified and is extended over a larger or smaller range of wave length, respectively.

The signs of such line plates or scale bodies which are formed of such glass-like layers and of a non-transparent layer disposed between the glass-like layers, for instance by means of a metal layer, appear dark looking at it from the front or from its rear and the light reflected therefrom corresponds to an insignificantly small fraction of the on-falling light.

The above-stated steps 1 to 6 of the present process or method are now described in more detail, as follows:

*Step 1.*—A line base is applied to the transparent carrier, for instance glass, which line base is easily partly removable either by mechanical means, for instance by means of a tool of a marking device, or which line base comprises preferably organic material which is soluble in suitable solvents, for instance water, alcohol and the like. Such solvents may be shellac with ethyl alcohol, or distilled water with borate of sodium.

*Step 2.*—In this step, two different cases must be distinguished, depending upon whether the signs in the line base are produced by mechanical means or by photo-mechanical means.

(a) If the signs are produced by mechanical means, the line base may comprise any suitable well soluble material and the signs are produced by means of a tool of a marking device. As material for the line base can be used an artificial resin varnish, for instance polystyrol, dissolved in toluol with an addition of softeners. Another possibility is to use a natural resin varnish, for instance colophony and elemi resin, dissolved in amylacetate.

(b) If the signs are produced by photo-mechanical means, a light sensitive line base is applied, which line base is well soluble in a solvent and its unexposed state, for instance by using a gelatin layer to which ammoniumbichromate has been applied or a shellac layer to which a bichromate salt has been applied. The carrier plate which is covered with such a light sensitive layer is exposed through an original pattern. Upon development thereafter in a solvent, for instance water, the non-exposed and thus non-hardened parts are removed, so that only the exposed and tanned parts remain on the carrier and represent thus a picture of the original pattern copied thereon.

As photo-mechanical line base material can be used, for instance substances as applied in the cold enamel process as follows:

Solution I:
100 g. shellac
500 g. ethyl alcohol

Solution II:
1000 ccm. $H_2O$ distilled
20 g. $NaBO_3.4H_2O$ (borate of sodium)

The solution I is boiled together with the solution II. The thus saponified shellac is washed with warm water and then dried.

The solution for the manufacture of the photo-mechanical line base consists of:

100 g. saponified shellac (see above)
1000 ccm. ethyl alcohol
100 ccm. ammonium-bichromate solution of 30% concentration

*Step 3.*—A transparent layer of glass-like material is applied in a high vacuum to the relief picture produced in accordance with steps 1 and 2 with such a thickness that the optical thickness of the layer amounts to about one-quarter of the wave length of the light, at which the finished line plate, scale and the like is to be used.

*Step 4.*—A layer of non-transparent material, for instance a metal as chrome, is applied over the glass-like layer in a high vacuum in vapor form.

*Step 5.*—A further glass-like layer of an optical thickness of about one-quarter of the wave length of the light, at which the finished line plate, scale and the like is to be used, is now applied over the non-transparent layer, as for instance a metal layer, produced during step 4, which layer is likewise applied in vapor form in a vacuum.

*Step 6.*—The surface of the carrier is treated with solvent, in which the parts of the line base applied in step 1 which remain and have been tanned are dissolved, so that simultaneously with these remaining parts of the line base, the two glass-like layers disposed on top thereof and the nontransparent layer are lifted from the carrier, however, not those ranges of the layers applied by vapor, the first glass-like layer of which has been applied by vapor in step 3 and sits directly on the carrier.

With these and other objects in view, which will become apparent in the following detailed description, the present invention will be clearly understood in connection with the accompanying drawings, in which.

Figure 1:
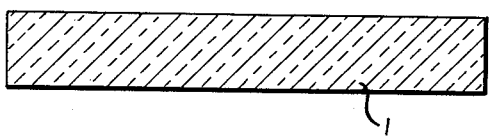
FIGURES 1 to 9 are schematic views disclosing the six method steps.
Figure 2:
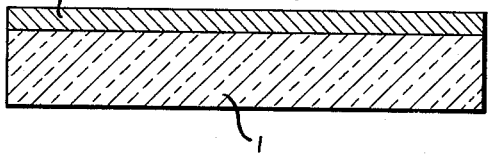

Referring now to the drawings, and in particular to FIGS. 1 to 9, it will be readily seen that FIG. 1 shows the carier plate 1, while FIG. 2 demonstrates the carrier plate 1 together with the line base 2 applied thereto.

FIG. 3 shows again the carrier plate with the line base 2 applied thereto, a pattern being copied on top of the latter, which pattern comprises a carrier glass 5 having transparent areas 3 and non-transparent areas 4.

Figure 3:
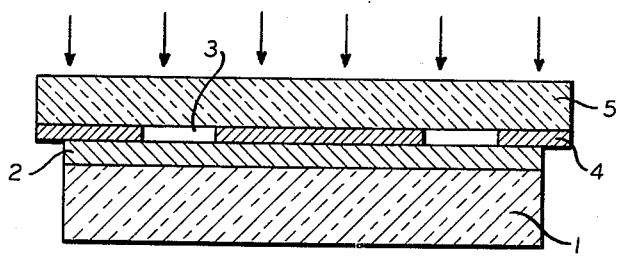
Figure 4:
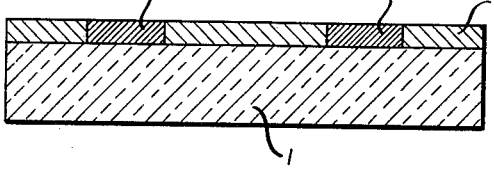

It may be readily ascertained from FIGS. 3 and 4 that the carrier plate 1 with the line base 2 after exposure through the pattern which comprises the carrier glass 5 having transparent areas 3 and the non-transparent areas 4. The exposed areas 6 of the line base 2 have been rendered insoluble, while the non-exposed areas 7 retain their solubility.

Figure 5:
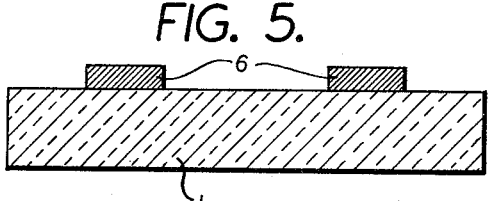

The schematic showing in FIG. 5 indicates the state in the method wherein the carrier plate 1 with the partly exposed and the partly non-exposed layer 2 has been treated with a solvent for the non-exposed layer areas 7. The non-exposed layer areas 7 have been dissolved and only the exposed areas 6 of the sign forming layer 2 remain on the carrier plate 1.

Figure 6:
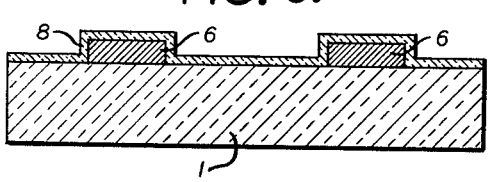

Referring now to FIG. 6, it will be readily seen that the state of the method is shown, wherein a film 8 of glass-like material has been applied in vapor form in vacuum to the carrier plate 1 with the exposed areas of the sign forming layer 6 with such a thickness, that the optical thickness of the layer corresponds with about one-quarter of the wave length of the light, at which the finished line plate and the scale, respectively, is to be used. The application of the film 8 may be dispensed with and a metal film 9, as shown in FIG. 7, may be applied directly to the carrier plate 1.

Figure 7:
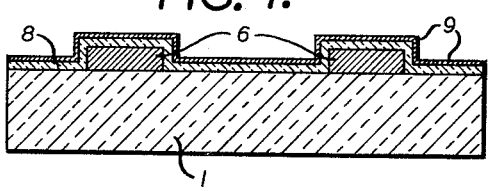

In FIG. 7 the status of the method of the present invention is disclosed after a non-transparent film, for instance a metal film 9, has been applied in vapor form in a high vacuum to the film 8 which consists of glass-like material.

Figure 8:
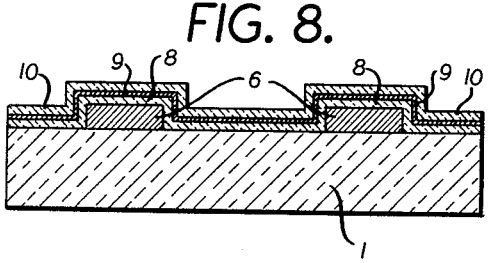

As it can now be seen in FIG. 8 of the drawing, a second transparent layer 10 of glass-like material, or if the first transparent layer 8 has been dispensed with a first transparent layer 10 is applied in vapor form in a high vacuum over the non-transparent film, for instance metal film 9 of FIG. 7, the layer thickness of the transparent film 10 being chosen in such a manner that the optical thickness of the film is again about one-quarter of the wave length of the light at which the finished line plate or scale is to be used.

Figure 9:
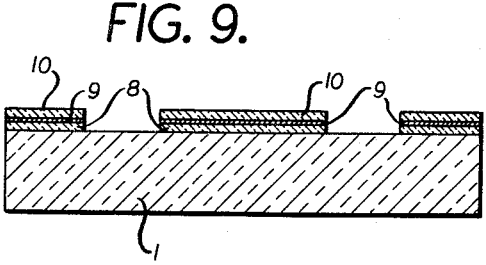

FIG. 9 shows the status of the method wherein the carier plate 1 with the exposed areas of the sign-forming layer 6 and the layers 8 of glass-like substances, if they have been applied, the film 9 of metal and the layer 10 of glass-like substances have been treated with a solvent for the exposed and thus hardened sign-forming layer 6.

The exposed sign-forming layer 6 together with the areas of the films 9 and 10, and if applied also of the film 8, disposed on top thereof have been removed thereby. FIG. 9 shows the finished line plate or the finished scale body, that is one embodiment of the final product which is also shown in FIG. 13, the signs of which have been formed through the areas in which the glass-like layer 8 sits directly on the carrier plate 1, for instance on the glass surface.

As stated above, it is of course also possible to produce the signs on the line base by mechanical means. In this case, the desired signs are produced for instance by means of a tool in the sign-forming layer 2 (FIG. 2) and thus the state shown in FIG. 5 is directly brought about.

Figure 13:
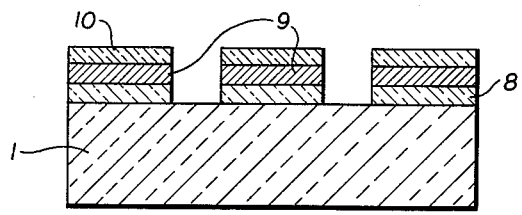

The steps disclosed in FIGS. 6 to 9 are then performed unchanged in the manner described above, in order to arrive at the embodiment of the final product shown in FIG. 13.

Figure 12:
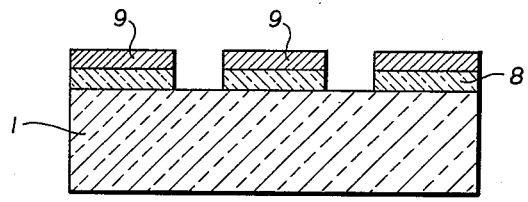
FIGS. 12 to 14 disclose three different embodiments of the final product.
Figure 14:
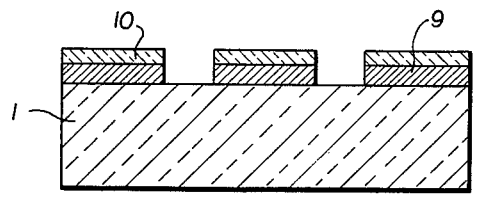

If the diminuation of the reflection of the top side of the sign can be neglected, the application of either the first film 8 of glass-like material or of the second film 10 of glass-like material, as shown in FIG. 8, can be eliminated and either the first layer is formed on the carrier plate 1 as the transparent film 8 of glass-like material and the second layer is formed on the transparent film 8 of glass-like material as the non-transparent metal film 9, leading to the final product shown in FIG. 12, or the first layer is formed on the carrier plate 1 as the non-transparent metal film 9 and the second layer is formed on the non-transparent metal film 9 as the transparent film 10 of glass-like material, leading to the final product shown in FIG. 14.

Figure 10:
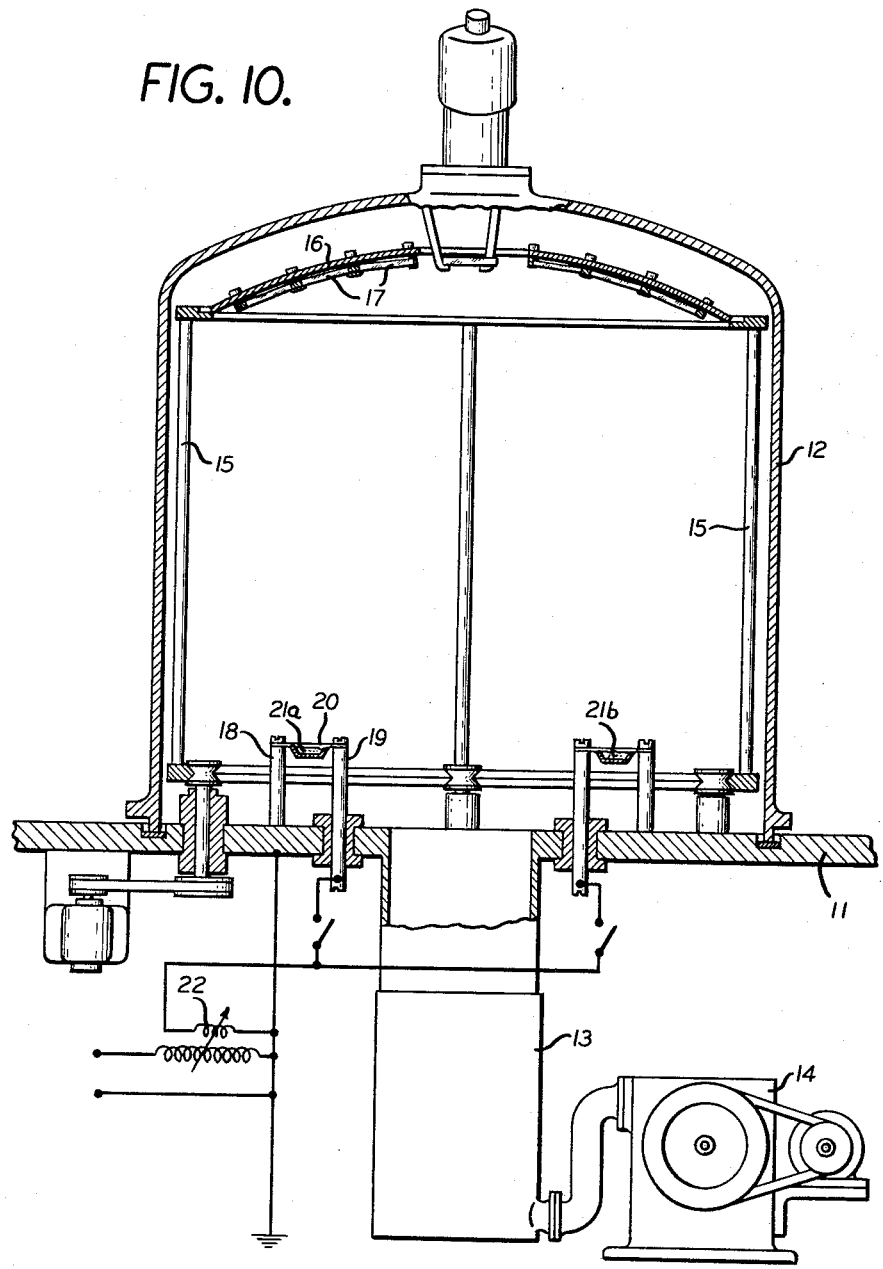
FIGS. 10 and 11 are axial sections of a conventional device for the application of thin layers of material in high vacuum.
Figure 11:
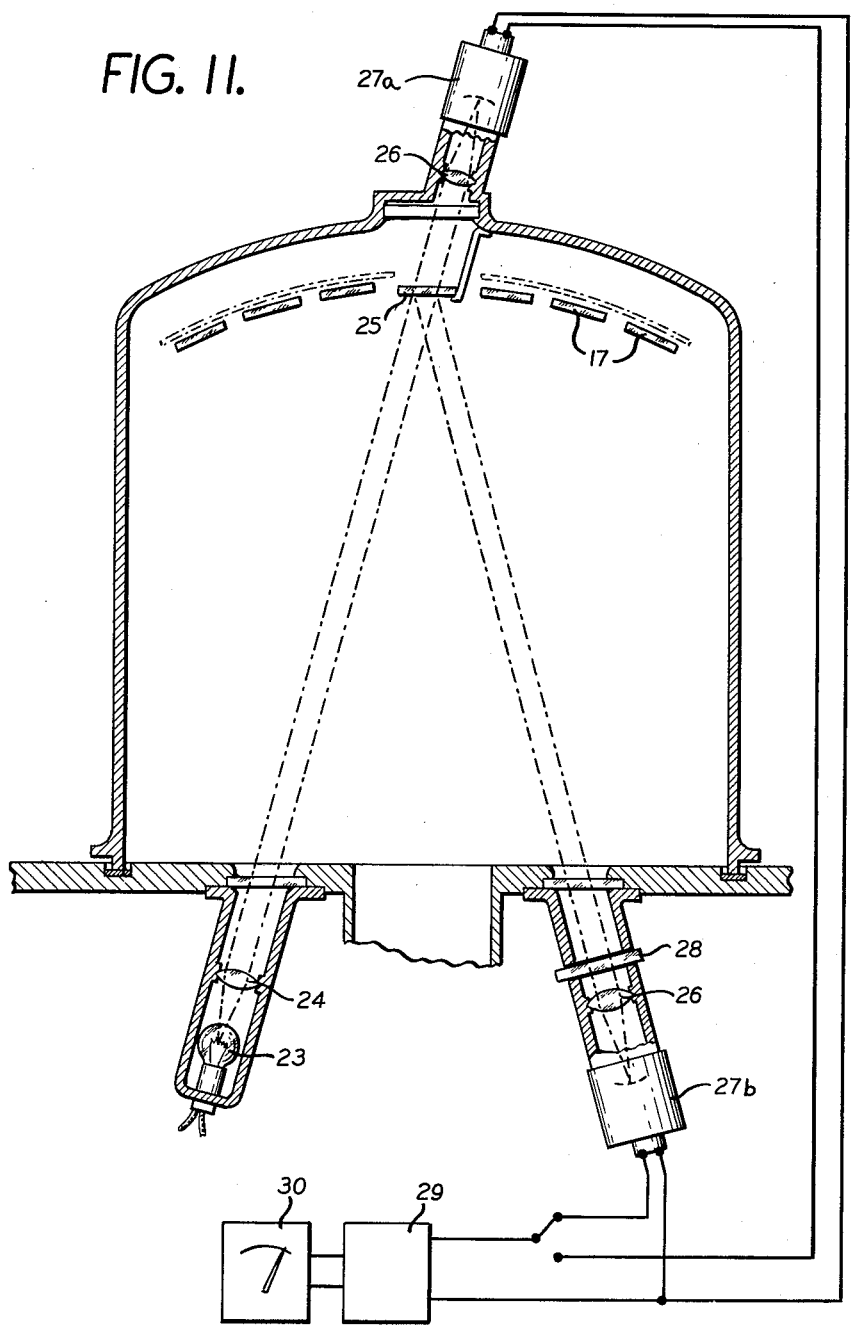

Referring now to FIGS. 10 and 11 of the drawings, a conventional device for applying of thin layers to a base in vapor form in high vacuum is disclosed. FIG. 10, in particular, shows a base or a carrier plate 11 which supports a recipient 12 in which the high vacuum required for the application of a layer by vapor is produced by means of the oil diffusion pump 13 with a rotary pump 14. The vapor material 17 is secured to a calotte-shaped carrier 16. The carier 16 is mounted on a rotary device 15 which makes it possible to permit rotation of the carrier 16 during the vaporizing process on top of the vapor sources. In this manner an equal distribution of the vapor substances on the carrier 16 with the vapor material 17 is secured. The vapor sources include an insulated conduit 19 for leading electric current thereto, a mass terminal 18 and a small container 20 which is made of a material having a high electrical resistance, for instance a tungsten sheet. The small container 20 contains the substances to be vaporized, thus the glass-like material 21a for instance silicium monoxide, and the non-transparent material 21b, for instance chrome.

These materials are heated to the vaporizing temperatures by means of Joule-heat. This is brought about with the help of electrical current of low voltage and high intensity of electrical current.

The desired temperature may be adjusted by means of a regulator transformer 22 and be maintained at such desired temperature.

The vapor sources may be brought into action selectively in predetermined succession.

Referring now to FIG. 11 of the drawings, the measuring device is designed as follows:

A constant light source 23 throws a bundle of light rays through the lens 24 onto the measuring glass 25. The transmitting portion of the light is focused by means of the condenser 26 onto the sensitive layer of the photo cell 27a. The reflected portion reaches the light sensitive layer of the photo cell 27b through the filter 28.

The photo current registered in the photo cells is amplified by means of the multiplier 29 and fed to the measuring instrument 30. It permits selectively a determination of the reflection of the transmission of the measuring glass 25. Since the measuring glass 25 is in equal median distance from the vapor sources as the material 17 on which a layer is to be applied, the measuring values apply also for the latter.

The manufacture of the line plates, scales, etc. takes place in the following manner:

The parts which have been prepared in accordance with step 1, steps 2a or step 2b are mounted on the calotte-shaped member 16 and they form the material 17 to which vapor is to be applied.

Upon the evacuation of the recipient 12 by means of the pumps 13 and 14, the vaporizing of the respective materials takes place. At first a quantity of the glass-like material 21a (step 3) is vaporized. The development of the evaporization is followed on the measuring instrument 30, which is coupled in this case with the photo cell 27b. The filter 28 is chosen in such a manner, that is corresponds to the wave length of the light, at which the line plates 17 are to be used later.

If the latter are viewed with the naked eye, for instance in daylight, a filter with 5,400 AE is chosen corresponding with the spectral sensitivity of the eye.

The vaporizing is then interrupted when the light quantity reflected from the measuring glass 25 and measured with the photo cell 27b has just passed a lower unit. This corresponds with an optical layer thickness of $$\frac{\lambda}{4}$$

for λ=5,400 AE on the base to receive the layer. Then the opaque material 21b (step 4) is vaporized from the other vapor source. In this measuring process the photo cell 27a is used. The vaporizing process is continued until the desired transparency is achieved on the measuring glass, for instance 1%.

Then a further quantity of glass-like material 21a is vaporized from the first vaporizing source (step 5). In this case again the determination of the $$\frac{\lambda}{4}$$

layer corresponds exactly with the above described one.

Now the vaporizing process, which lasts about 15 minutes, is terminated and the layer 17 applied in vapor form is removed from the device. The removal of the auxiliary layer (step 6) is now brought about for the parts prepared in accordance with step 2a by means of toluol or ammyl-acetate, while the dissolution prepared in accordance with 2b is brought about by alcoholic caustic soda.

While I have disclosed several embodiments of the present invention, it is to be understood that these embodiments are given by example only and not in a limiting sense, the scope of the present invention being determined by the objects and the claims.

I claim:

1. A method of manufacturing line plates, scales, and the like, by means of layers applied to a carrier plate in form of vapors in a high vacuum, comprising the steps of applying at least two superposed layers onto said carrier plate carrying a line base of a design complementary to that of the line plates to be produced, one of said layers being a layer of transparent inorganic material applied with a thickness corresponding with one-quarter of the wave length of the light at which the finished line plate is to be used, and the other of said layers being a layer of non-transparent metal material, and treating said two layers to remove the part of said line base of a design complementary to that of the line plates to be produced together with the portions of said two layers carried by said line base.

2. A method of manufacturing line plates, scales, and the like, by means of layers applied to a carrier plate in form of vapors in a high vacuum, comprising the steps of applying a first layer of transparent inorganic material onto said carrier plate carrying a line base of a design complementary to that of the line plates to be produced, said first layer being applied with a thickness corresponding with one-quarter of the wave length of the light at which the finished line plate is to be used, applying onto said first layer a second layer of non-transparent metal material, and treating said layers to remove the part of said line base of a design complementary to that of the line plates to be produced together with the portions of said first and second layers carried by said line base.

3. The method, as set forth in claim 2, which includes the step of applying a third transparent layer of inorganic material to said second layer, said third layer having a thickness so that the optical thickness of said third layer corresponds with about one-quarter of the wave length of the light at which the finished line plate is to be used.

4. A method of manufacturing line plates, scales and the like, by means of layers applied to a carrier plate in form of vapors in a high vacuum, comprising the steps of applying a first layer of non-transparent metal material onto said carrier plate carrying a line base of a design complementary to that of the line plates to be produced, applying onto said first layer a second layer of transparent, inorganic material, said second layer being applied with a thickness corresponding with one-quarter of the wave length of the light at which the finished line plate is to be used, and treating said layers to remove the part of said line base of a design complementary to that of the line plates to be produced together with the portions of said first and second layers carried by said line base.

5. The method, as set forth in claim 1, wherein said transparent inorganic layer comprises an oxide selected from the group consisting of SiO, $SiO_2$, $CeO_2$, and $TiO_2$.

6. The method, as set forth in claim 1, wherein said transparent inorganic layer comprises a fluoride selected from the group consisting of $MgF_2$ and $ThF_4$.

7. The method, as set forth in claim 1, wherein each of said layers comprises a plurality of interference layers.

References Cited in the file of this patent

UNITED STATES PATENTS

| | | |
|---|---|---|
| 2,352,085 | Dimmick | June 20, 1934 |
| 2,366,687 | Osterberg | Jan. 2, 1945 |
| 2,447,836 | Beeber et al. | Aug. 24, 1948 |
| 2,854,349 | Dreyfus et al. | Sept. 30, 1958 |